D. L. PETTIGREW.
Feed Rack.
No. 52,198. Patented Jan'y 23, 1866.
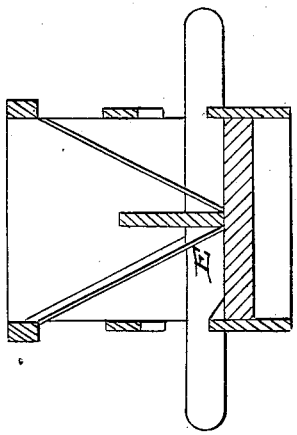
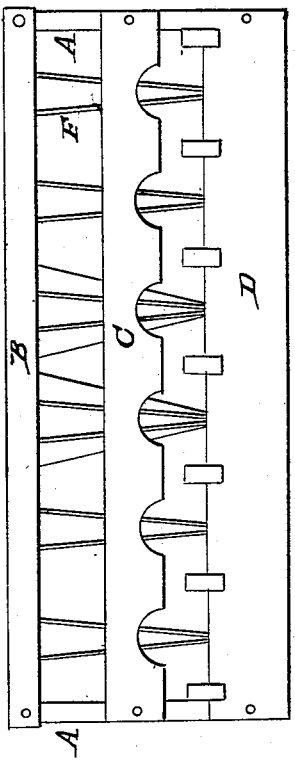
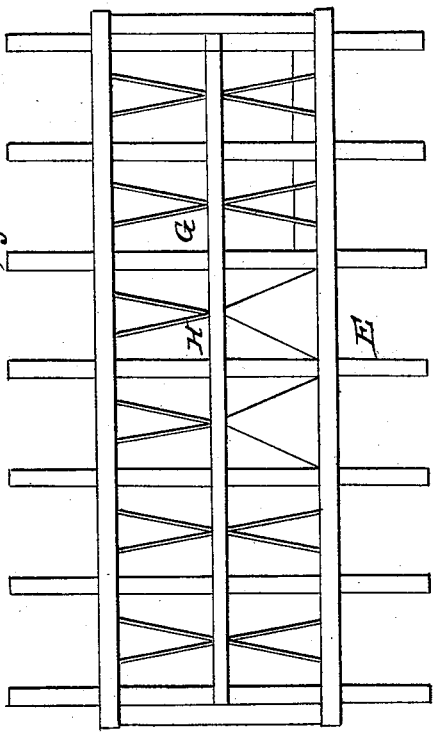

UNITED STATES PATENT OFFICE.

DAVID L. PETTEGREW, OF CLAREMONT, NEW HAMPSHIRE, ASSIGNOR TO HIMSELF AND JACOB SMITH, OF SAME PLACE.

IMPROVEMENT IN SHEEP-RACKS.

Specification forming part of Letters Patent No. 52,198, dated January 23, 1866.

*To all whom it may concern:*

Be it known that I, DAVID L. PETTEGREW, of Claremont, in the county of Sullivan and State of New Hampshire, have invented a new and valuable Improvement in Racks for Feeding Sheep; and I do hereby declare that the following is a full, clear, and exact description of the construction and operation of the same, reference being had to the annexed drawings, making a part of this specification, and to the letters of reference marked thereon.

The object of my invention is to provide as an article of manufacture a light, cheap, and portable rack for feeding sheep, so constructed as to secure to each sheep his share of the provender, to guard the wool against hay and other seeds and dirt, and also to insure great economy in the use of both hay and grain when given to the sheep for food.

I construct my sheep-rack as follows, namely: On the sides of two upright plank posts or end pieces, of suitable width, (marked A,) I attach three slats, (marked B, C, and D, respectively.)

The slat D reaches and rests upon the ground, and is of sufficient width to form a barrier about breast-high to a sheep. It is notched or mortised on its top to receive the cross-bars, hereinafter mentioned, and is firmly attached by nails or screws both to the ends and bottom of the rack.

The slat C is scooped or notched, as represented on the drawings, to make room for the sheep to reach their provender.

The slat B is fastened to the sides of the end pieces, A, on a line even with the tops thereof.

The bottom of my rack is raised about fifteen inches (more or less) from the ground, and is made secure by nails to the insides of the end pieces, A, and the slat D.

Passing across the bottom, and at right angles therewith, are the cross-bars or partition-bars, (marked E.) These bars project outward from the slat D about two feet, more or less, so as to form small pens, in which the sheep may enter one by one; but they are placed so near together that only one sheep can enter between them at the same time. I also pass wires F from the slat B to the middle of the bottom of the rack in a triangular direction, and uniting on said bottom, so as to form a hay-rack in which long provender may be fed to the sheep.

Fig. 3 shows a triangular board, which I use, when desirable, as a substitute for the wires F, or I may make it removable at pleasure and allow the wires F to remain. When in use it serves to protect the sheep and wool, in a great measure, from hay-seed and other hurtful substances.

I construct my sheep-rack in a double form by making each side thereof alike in all respects and placing a partition between them on the middle of the bottom and extending upward as far as may be necessary. This partition is shown on Fig. 2, (marked H.) Fig. 2 also represents the two sides of my sheep-rack, as described. I also sometimes nail a beveled strip of board to the bottom of the sheep-rack and rest the thick side thereof against the slat D. This is done to prevent any portion of the grain from being lost in the sharp angle when the slat D unites with the bottom.

In operating my device the long feed is thrown into the hay-rack and the grain is placed in the several compartments on the bottom.

It will readily be seen that in using this sheep-rack the small sheep as well as the large ones will remain masters of their several compartments, and thereby run no risk of being crowded away from their food by the larger animals.

What I claim as my invention, and desire to secure by Letters Patent, is—

The above-described rack for feeding sheep, as a new article of manufacture, substantially as set forth.

DAVID L. PETTEGREW.

Witnesses:
J. CLEMENT SMITH,
FRED. B. GINN.